US012719105B2

(12) United States Patent
Park et al.

(10) Patent No.: US 12,719,105 B2
(45) Date of Patent: Aug. 25, 2026

(54) BATTERY MODULE AND BATTERY PACK INCLUDING THE SAME

(71) Applicant: LG ENERGY SOLUTION, LTD., Seoul (KR)

(72) Inventors: Won Kyoung Park, Daejeon (KR); Junyeob Seong, Daejeon (KR); Subin Park, Daejeon (KR); Honggoo Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 693 days.

(21) Appl. No.: 18/024,169

(22) PCT Filed: Jan. 6, 2022

(86) PCT No.: PCT/KR2022/000248
§ 371 (c)(1),
(2) Date: Mar. 1, 2023

(87) PCT Pub. No.: WO2022/149884
PCT Pub. Date: Jul. 14, 2022

(65) Prior Publication Data

US 2023/0369675 A1 Nov. 16, 2023

(30) Foreign Application Priority Data

Jan. 11, 2021 (KR) ........................ 10-2021-0003183

(51) Int. Cl.
*H01M 10/6551* (2014.01)
*H01M 10/613* (2014.01)
(Continued)

(52) U.S. Cl.
CPC ..... *H01M 10/6551* (2015.04); *H01M 10/613* (2015.04); *H01M 10/653* (2015.04);
(Continued)

(58) Field of Classification Search
None
See application file for complete search history.

(56) References Cited

U.S. PATENT DOCUMENTS

2009/0325055 A1* 12/2009 Koetting ............. H01M 10/613
429/120
2011/0300428 A1 12/2011 Sohn
(Continued)

FOREIGN PATENT DOCUMENTS

CN 104979601 A 10/2015
CN 108140752 A 6/2018
(Continued)

OTHER PUBLICATIONS

JP-4440553-B2 English machine translation (Year: 2010).*
(Continued)

*Primary Examiner* — Scott J. Chmielecki
(74) *Attorney, Agent, or Firm* — Birch, Stewart, Kolasch & Birch, LLP

(57) ABSTRACT

A battery module includes a battery cell stack in which a plurality of battery cells including electrode leads are stacked; an elastic member for covering a front surface, rear surface and both side surfaces of the battery cell stack; a heat sink located under the battery cell stack; and a thermal conductive resin layer located between the battery cell stack and the heat sink, wherein the elastic member is opened in its lower portion, and a lower surface of the battery cell stack comes into contact with the thermal conductive resin layer.

15 Claims, 18 Drawing Sheets

Conventional Art

(51) Int. Cl.

| | |
|---|---|
| ***H01M 10/653*** | (2014.01) |
| ***H01M 10/6554*** | (2014.01) |
| ***H01M 10/6556*** | (2014.01) |
| ***H01M 50/211*** | (2021.01) |

(52) U.S. Cl.

CPC ... *H01M 10/6554* (2015.04); *H01M 10/6556* (2015.04); *H01M 50/211* (2021.01); *H01M 2220/20* (2013.01)

(56) References Cited

U.S. PATENT DOCUMENTS

| | | | | |
|---|---|---|---|---|
| 2012/0009455 | A1* | 1/2012 | Yoon | H01M 10/6554 429/120 |
| 2014/0023906 | A1* | 1/2014 | Hashimoto | H01M 10/625 429/157 |
| 2014/0087231 | A1 | 3/2014 | Schaefer et al. | |
| 2014/0134462 | A1 | 5/2014 | Choi et al. | |
| 2014/0193686 | A1 | 7/2014 | Siering et al. | |
| 2014/0349209 | A1 | 11/2014 | Todo et al. | |
| 2015/0144314 | A1 | 5/2015 | Srinivassan et al. | |
| 2016/0097598 | A1* | 4/2016 | Hirsch | H01M 10/6556 165/175 |
| 2016/0164148 | A1* | 6/2016 | Yum | H01M 10/6551 429/120 |
| 2016/0248070 | A1 | 8/2016 | Ahn | |
| 2017/0122679 | A1* | 5/2017 | Kenney | F28F 3/10 |
| 2018/0114961 | A1 | 4/2018 | Kim et al. | |
| 2018/0151930 | A1* | 5/2018 | Kim | H01M 10/6554 |
| 2018/0287106 | A1 | 10/2018 | Schoenherr | |
| 2018/0366794 | A1 | 12/2018 | Kim et al. | |
| 2019/0109352 | A1 | 4/2019 | Krämer | |
| 2019/0173064 | A1* | 6/2019 | Lee | H01M 10/625 |
| 2019/0198953 | A1 | 6/2019 | Krämer | |
| 2019/0260004 | A1 | 8/2019 | Krämer | |
| 2019/0260006 | A1 | 8/2019 | Krämer | |
| 2019/0260099 | A1* | 8/2019 | Ju | H01M 10/486 |
| 2020/0212523 | A1* | 7/2020 | Wang | H01M 10/658 |
| 2022/0158270 | A1 | 5/2022 | Lee et al. | |
| 2022/0247004 | A1 | 8/2022 | Yun | |
| 2022/0302529 | A1 | 9/2022 | Kim | |
| 2022/0367940 | A1* | 11/2022 | Yun | H01M 10/613 |

FOREIGN PATENT DOCUMENTS

| | | | | |
|---|---|---|---|---|
| CN | 209104213 | U | 7/2019 | |
| DE | 10 2017 106 899 | A1 | 10/2018 | |
| JP | 3289756 | B2 | 6/2002 | |
| JP | 4440553 | B2 * | 3/2010 | H01M 10/613 |
| JP | 2012-18915 | A | 1/2012 | |
| JP | 2015-153743 | A | 8/2015 | |
| JP | 2018-501603 | A | 1/2018 | |
| JP | 2019-516225 | A | 6/2019 | |
| JP | 2020-9672 | A | 1/2020 | |
| JP | 2020-502724 | A | 1/2020 | |
| JP | 2020-523749 | A | 8/2020 | |
| JP | 2022-551881 | A | 12/2022 | |
| KR | 10-1084066 | B1 | 11/2011 | |
| KR | 10-1233318 | B1 | 2/2013 | |
| KR | 10-1469518 | B1 | 12/2014 | |
| KR | 10-2015-0050314 | A | 5/2015 | |
| KR | 10-2015-0085951 | A | 7/2015 | |
| KR | 10-2016-0078035 | A | 7/2016 | |
| KR | 10-2018-0044083 | A | 5/2018 | |
| KR | 10-2018-0047383 | A | 5/2018 | |
| KR | 10-2018-0061702 | A | 6/2018 | |
| KR | 10-2018-0130245 | A | 12/2018 | |
| KR | 10-2019-0063809 | A | 6/2019 | |
| KR | 10-2032356 | B1 | 11/2019 | |
| KR | 10-2082385 | B1 | 2/2020 | |
| KR | 10-2021-0000551 | A | 1/2021 | |

OTHER PUBLICATIONS

International Search Report for PCT/KR2022/000248 (PCT/ISA/210) mailed on May 4, 2022.

Extended European Search Report for European Application No. 22736861.0, dated Feb. 5, 2025.

Partial Supplementary European Search Report for European Application No. 22736861.0, dated Sep. 18, 2024.

* cited by examiner

Conventional Art

BATTERY MODULE AND BATTERY PACK INCLUDING THE SAME

CROSS CITATION WITH RELATED APPLICATION(S)

This application claims the benefit of Korean Patent Application No. 10-2021-0003183 filed on Jan. 11, 2021 with Korean Intellectual Property Office, the disclosure which is incorporated herein by reference in its entirety.

TECHNICAL FIELD

The present disclosure relates to a battery module and a battery pack including the same, and more particularly, to a battery module having improved cooling performance and a battery pack including the same.

BACKGROUND

In modern society, as portable devices such as a mobile phone, a notebook computer, a camcorder and a digital camera has been daily used, the development of technologies in the fields related to mobile devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, there is a growing need for development of the secondary battery.

Currently commercialized secondary batteries include a nickel cadmium battery, a nickel hydrogen battery, a nickel zinc battery, a lithium secondary battery, and the like. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate each coated with the positive electrode active material and the negative electrode active material are disposed with a separator being interposed between them, and a battery case that seals and houses the electrode assembly together with an electrolyte solution.

Generally, the lithium secondary battery may be classified based on the shape of the exterior material into a can type secondary battery in which the electrode assembly is mounted in a metal can, and a pouch-type secondary battery in which the electrode assembly is mounted in a pouch made of an aluminum laminate sheet.

In the case of a secondary battery used for small-sized devices, two to three battery cells are disposed, but in the case of a secondary battery used for a middle or large-sized device such as an automobile, a battery module in which a large number of battery cells are electrically connected is used. In such a battery module, a large number of battery cells are connected to each other in series or in parallel to form a cell stack, thereby improving capacity and output. In addition, one or more battery modules may be mounted together with various control and protection systems such as BMS (battery management system) and a cooling system to form a battery pack.

When the temperature of the secondary battery rises higher than an appropriate temperature, the performance of the secondary battery may be deteriorated, and in the worst case, there is also a risk of an explosion or ignition. In particular, a large number of secondary batteries, that is, a battery module or a battery pack having battery cells, can add up the heat generated from the large number of battery cells in a narrow space, so that the temperature can rise more quickly and severely. In other words, a battery module in which a large number of battery cells are stacked, and a battery pack equipped with such a battery module can obtain high output, but it is not easy to remove heat generated from the battery cells during charging and discharging. When the heat dissipation of the battery cell is not properly performed, deterioration of the battery cells is accelerated, the lifespan is shortened, and the possibility of explosion or ignition increases.

Moreover, in the case of a middle or large-sized battery module included in a vehicle battery pack, it is frequently exposed to direct sunlight and can be subjected to high-temperature conditions such as summer or desert areas.

Therefore, when a battery module or a battery pack is configured, it may be very important to stably and effectively ensure the cooling performance.

FIG. 1 is a perspective view of a conventional battery module. FIG. 2 is a cross-sectional view showing a cross section taken along the cutting line A-A' of FIG. 1. At this time, a heat transfer member and a heat sink located under the battery module are further shown in FIG. 2.

Referring to FIGS. 1 and 2, the conventional battery module 10 is configured such that a plurality of battery cells 11 are stacked to form a battery cell stack 20, and the battery cell stack 20 is housed in the module frame 30.

As described above, since the battery module 10 includes a plurality of battery cells 11, it generates a large amount of heat in a charge and discharge process. As a cooling means, the battery module 10 may include a thermal conductive resin layer 40 that is located between the battery cell stack 20 and the bottom portion 31 of the module frame 30. In addition, when the battery module 10 is mounted on the pack frame to form a battery pack, a heat transfer member 50 and a heat sink 60 may be sequentially located under the battery module 10. The heat transfer member 50 may be a heat dissipation pad, and the heat sink 60 may have a refrigerant flow passage formed therein.

The heat generated from the battery cell 11 passes through the thermal conductive resin layer 40, the bottom portion 31 of the module frame 30, the heat transfer member 50, and the heat sink 60 in this order, and then is transmitted to the outside.

By the way, in the case of the conventional battery module 10, the heat transfer path is complicated as described above and thus, it is difficult to effectively transfer the heat generated from the battery cell 11. The module frame 30 itself may deteriorate heat transfer properties, and a fine air layer such as an air gap, which can be formed in the space between the module frame 30, the heat transfer member 50, and the heat sink 60, respectively, may also be a factor that deteriorates the heat transfer properties.

As for the battery module, since other demands such as downsizing of module and an increase in capacity are also continuing, it can be said that it is practically necessary to develop a battery module capable of satisfying these various requirements while improving the cooling performance.

DETAILED DESCRIPTION OF THE INVENTION

Technical Problem

It is an object of the present disclosure to provide a battery module having improved cooling performance and a battery pack including the same.

However, the problem to be solved by embodiments of the present disclosure is not limited to the above-described problems, and can be variously expanded within the scope of the technical idea included in the present disclosure.

Technical Solution

According to one embodiment of the present disclosure, there is provided a battery module comprising: a battery cell stack in which a plurality of battery cells having electrode leads are stacked; an elastic member for covering a front surface, a rear surface and side surfaces of the battery cell stack; a heat sink located under the battery cell stack; and a thermal conductive resin layer located between the battery cell stack and the heat sink, wherein a lower portion of the elastic member is open, and a lower surface of the battery cell stack contacts the thermal conductive resin layer.

The elastic member may be continuous along the front surface, the rear surface and both side surfaces of the battery cell stack.

The heat sink may include an upper plate and a lower plate that form a space in which refrigerant flows, the upper plate may include upper extension portions extending from opposite sides of the upper plate, and the lower plate may include lower extension portions extending from opposite sides of the lower plate to a portion where the upper extension portions are located.

An upper through-hole may be formed in the upper extension portions, and a lower through-hole may be formed in the lower extension portions.

The lower plate may include a base portion joined to the upper plate, and a recessed portion that is recessed downward from the base portion to form a refrigerant flow path.

The battery module may further include a first sensing block and a second sensing block each covering the front surface and the rear surface of the battery cell stack from which the electrode leads protrude, respectively. At least two of the electrode leads may pass through a slit of the first sensing block or a slit of the second sensing block, and then may be bent and joined to form an electrode lead joint. The elastic member may be continuous along the first sensing block, the second sensing block, and the side surfaces of the battery cell stack.

According to another embodiment of the present disclosure, there is provided a battery pack comprising: the above-mentioned battery module; a pack frame for housing the battery module; a refrigerant-delivering bolt for fixing the heat sink of the battery module to the pack frame; and a pack refrigerant pipe for supplying or discharging the refrigerant to the heat sink, wherein a connection pipe for connecting the pack refrigerant pipe and the heat sink is formed inside the refrigerant-delivering bolt.

The refrigerant-delivering bolt may include a first opening and a second opening that are connected to the connection pipe, the first opening may be disposed inside the pack refrigerant pipe, and the second opening may be disposed inside the heat sink.

The heat sink may include an upper plate and a lower plate that form a space in which refrigerant flows, the upper plate may include upper extension portions extending from sides of the upper plate, and the lower plate may include lower extension portions extending from sides of the lower plate to a portion where the upper extension portions are located.

The refrigerant-delivering bolt may fix the upper extension portions and the lower extension portions to the pack frame.

An upper through-hole into which the refrigerant-delivering bolt can be inserted may be formed in the upper extension portions, and a lower through-hole into which the refrigerant-delivering bolt can be inserted may be formed in the lower extension portions. The refrigerant-delivering bolt may pass through the upper through-hole and the lower through-hole, and can be fixed to the pack frame.

The refrigerant-delivering bolt may include a first opening and a second opening that are connected to the connection pipe, the first opening may be disposed inside the pack refrigerant pipe, and the second opening may be disposed between the upper extension portions and the lower extension portions.

The upper extension portions and the lower extension portions may be extended so as to pass through the elastic member.

The refrigerant-delivering bolt may fix the pack refrigerant pipe to the pack frame.

The pack refrigerant pipe may include a pack refrigerant supply pipe and a pack refrigerant discharge pipe, the refrigerant-delivering bolt may be configured by a plurality of numbers, and a first refrigerant-delivering bolt may connect the pack refrigerant supply pipe and the heat sink, and a second refrigerant-delivering bolt may connect the pack refrigerant discharge pipe and the heat sink.

The battery pack may have a bolt for fixing the heat sink of the battery module to the pack frame passing through the upper through-hole and the lower through-hole.

The battery pack may have a pack refrigerant pipe on the heat sink, the bolt passing through the pack refrigerant pipe, wherein the bolt has a connection pipe, a first opening in the bolt allowing the connection pipe to be in fluid communication with the heat sink and a second opening in the bolt allowing the connection pipe to be in fluid communication with the pack refrigerant pipe.

Advantageous Effects

According to embodiments of the present disclosure, the structure that exposes the lower surface of the battery cell stack can simplify the heat transfer path and improve the cooling performance.

In addition, by using the refrigerant-delivering bolt in which the refrigerant flow path is formed, the mounting-fixing and pressure sealing can be performed at the same time, the number of parts can be reduced, and the structure can be simplified.

The effects of the present disclosure are not limited to the effects mentioned above and additional other effects not described above will be clearly understood from the description of the appended claims by those skilled in the art.

DETAILED DESCRIPTION OF THE EMBODIMENTS

Figure 1:
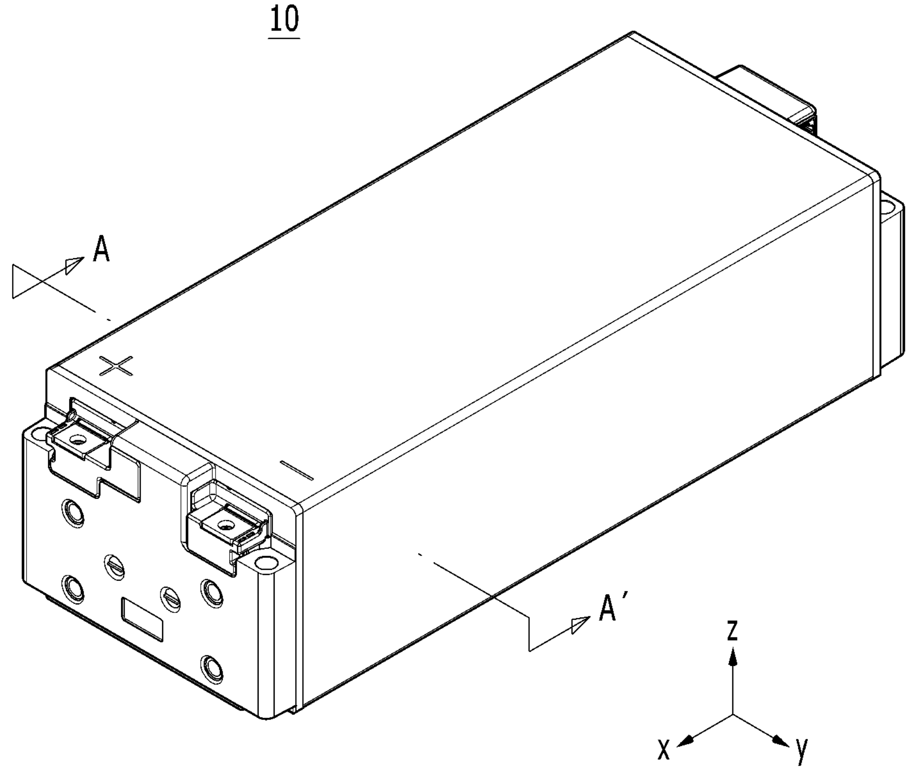
FIG. 1 is a perspective view of a battery module.

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Figure 3:
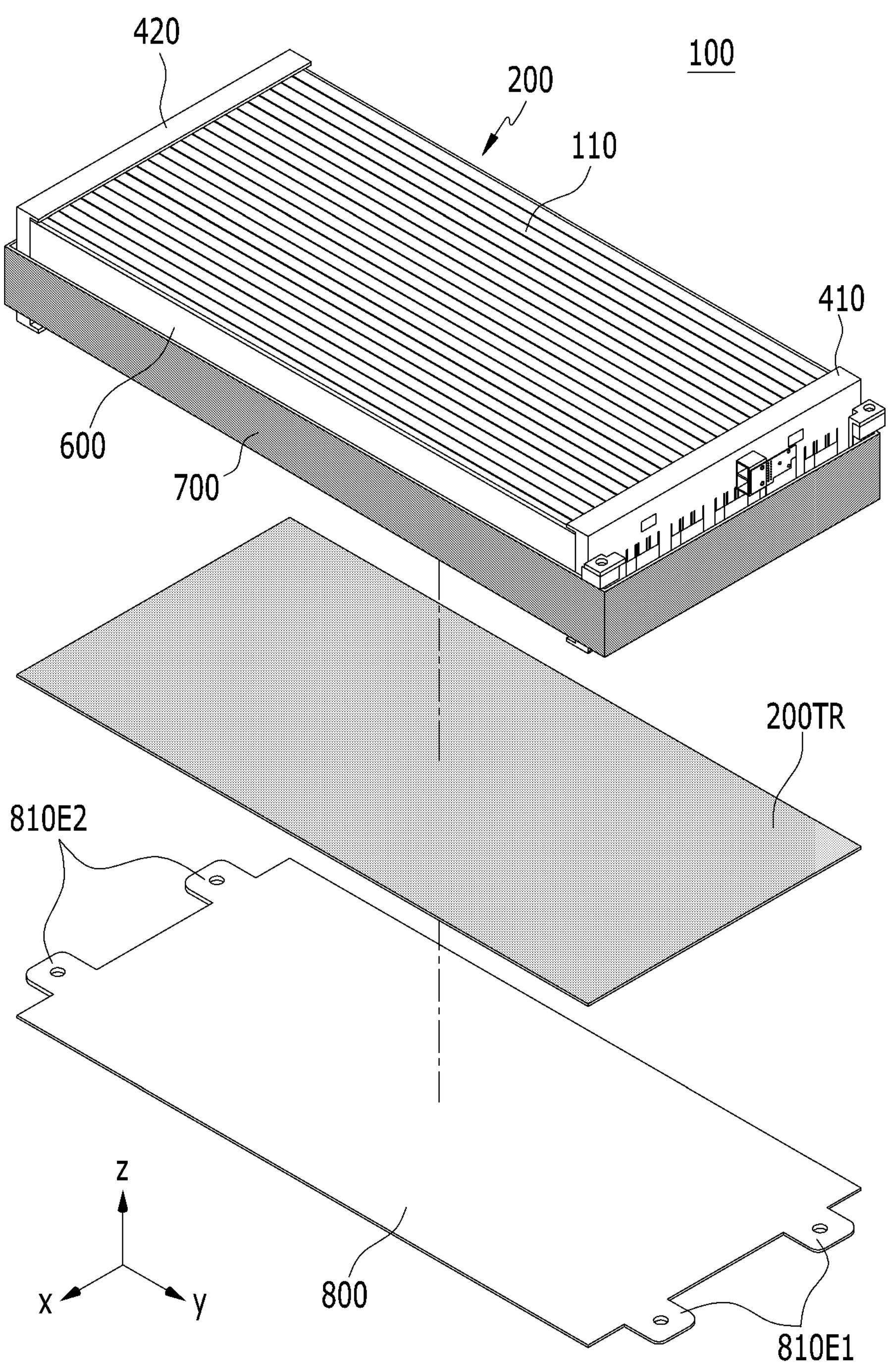
FIG. 3 is a perspective view showing a battery module according to an embodiment of the present disclosure.
Figure 4:
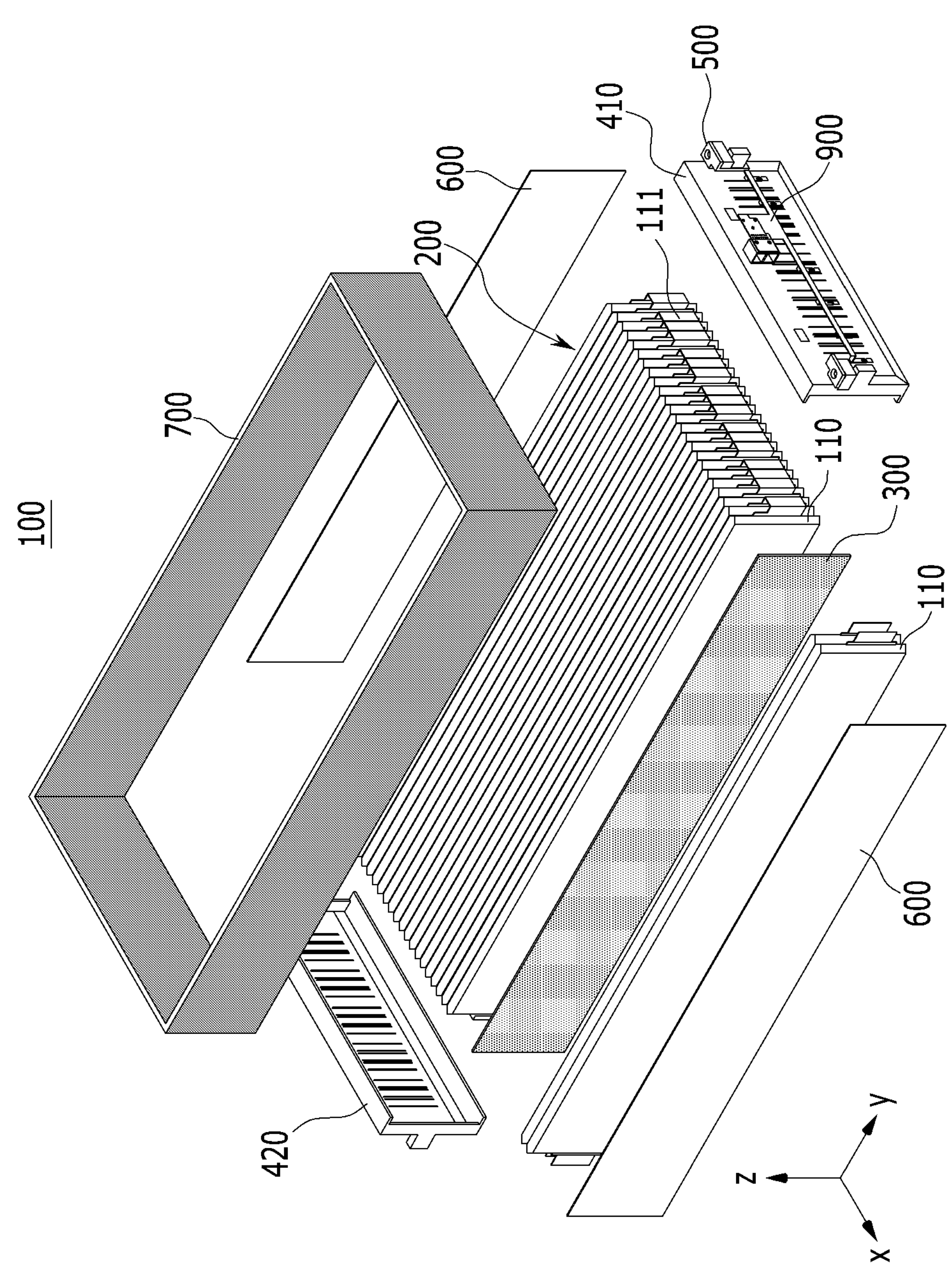
FIG. 4 is an exploded perspective view of the battery module of FIG. 3 excluding a thermal conductive resin layer and a heat sink.
Figure 5:
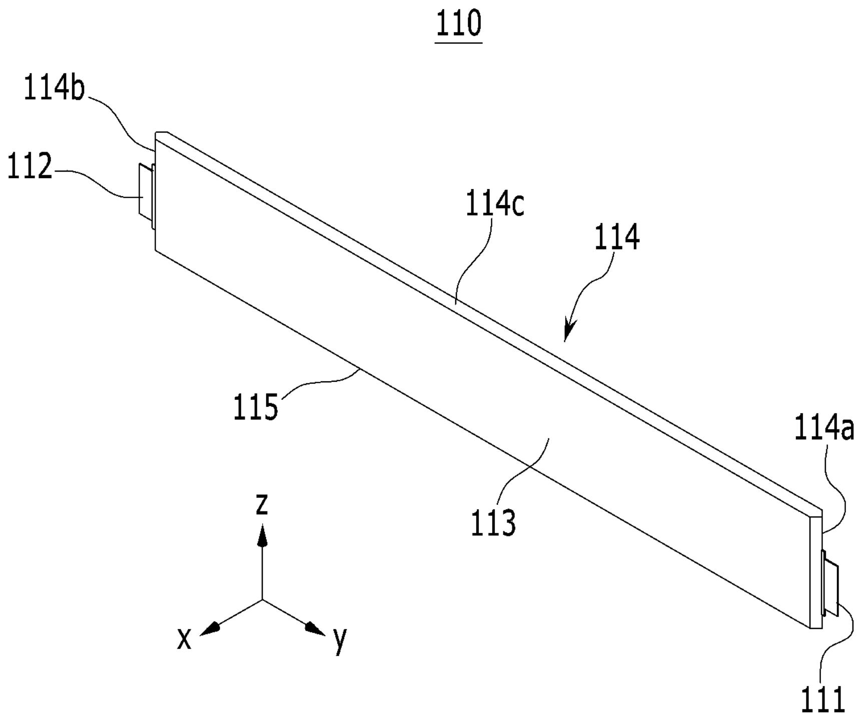
FIG. 5 is a perspective view showing a battery cell included in the battery module of FIG. 3.

FIG. 3 is a perspective view showing a battery module according to an embodiment of the present disclosure. FIG. 4 is an exploded perspective view of the battery module of FIG. 3 excluding a thermal conductive resin layer and a heat sink. FIG. 5 is a perspective view showing a battery cell included in the battery module of FIG. 3.

A battery module according to one embodiment of the present disclosure includes a battery cell stack 200 in which a plurality of battery cells 110 including electrode leads 111 and 112 are stacked; an elastic member 700 for covering the front surface, rear surface and both side surfaces of the battery cell stack 200; a heat sink 800 located under the battery cell stack 200; and a thermal conductive resin layer 200TR located between the battery cell stack 200 and the heat sink 800. Here, the front surface means a surface of the battery cell stack 200 in the y-axis direction, the rear surface means a surface of the battery cell stack 200 in the −y-axis direction, and the both side surfaces mean the surfaces of the battery cell stack 200 in the x-axis and −x-axis directions, respectively. Further, the lower surface means a surface of the battery cell stack 200 in the −z-axis direction, and the upper surface means a surface of the battery cell stack 200 in the z-axis direction. However, these are the surfaces indicated for convenience of explanation, and may vary depending on a position of an object, a position of an observer, or the like. Although described below, the front surface and the rear surface of the battery cell stack 200 may be surfaces on which the protruding first and second electrode leads 111 and 112 of the battery cells 110 are located.

First, the battery cell 110 is preferably a pouch-type battery cell, and may be formed in a rectangular sheet-like structure. The battery cell 110 according to the present embodiment includes protruding first and second electrode leads 111 and 112. Specifically, the battery cells 110 according to the present embodiment have a structure in which the first and second electrode leads 111 and 112 protrude from one end part 114*a* and the other end part 114*b* which are disposed on the opposite sides to each other in reference to the cell body 113, respectively. More specifically, the first and second electrode leads 111 and 112 are connected to an electrode assembly (not shown) and protrude from the electrode assembly (not shown) to the outside of the battery cell 110. The first and second electrode leads 111 and 112 have different polarities from each other, and for example, one of them may be a positive electrode lead 111 and the other may be a negative electrode lead 112. That is, the positive electrode lead 111 and the negative electrode lead 112 can be protruded in opposite directions with reference to one battery cell 110.

Meanwhile, the battery cell 110 can be produced by joining both end parts 114*a* and 114*b* of a cell case 114 and one side part 114*c* connecting them in a state in which an electrode assembly (not shown) is housed in a cell case 114. In other words, the battery cell 110 according to the present embodiment has a total of three sealing portions, the sealing portion has a structure in which it is sealed by a method such as heat fusion, and the remaining other side part may be composed of a connection portion 115. The cell case 114 may be composed of a laminate sheet including a resin layer and a metal layer.

Such battery cells 110 may be formed by a plurality of numbers, and the plurality of battery cells 110 are stacked so as to be electrically connected to each other, thereby forming a battery cell stack 200. In particular, as shown in FIG. 3, the plurality of battery cells 110 may be stacked along the x-axis direction. Thereby, the electrode leads 111 and 112 can be protruded in the y-axis direction and the −y-axis direction, respectively. That is, the first electrode lead 111 and the second electrode lead 112 may be located on the front surface and the rear surface of the battery cell stack 200.

The elastic member 700 according to the present embodiment may be continuously connected along the front surface, the rear surface, and both side surfaces of the battery cell stack 200. In the process of repeatedly charging and discharging the plurality of battery cells 110, a phenomenon in which the internal electrolyte is decomposed to generate gas and the battery cells 110 swell up, that is, a swelling phenomenon may occur. In particular, each battery cell 110 may be swelled in the stacking direction (a direction parallel to the x-axis) of the battery cells 110. In the present embodiment, since the elastic member 700 having elasticity is continuously connected along the front surface, the rear surface, and both side surfaces of the battery cell stack 200, swelling of the battery cells 110 can be suppressed, and deformation of the battery module 100 in the stacking direction of the battery cells 110 can be minimized.

In addition, the battery module according to the present embodiment forms a module-less structure in which the module frame and the end plate have been removed. Instead of the module frame or the end plate, the battery module 100 according to the present embodiment can maintain and fix its shape by the elastic member 700. As the module frame and the end plate are removed, complicated processes that require precise control, such as the process of housing the battery cell stack 200 inside the module frame, or the process of assembling module frames and end plates, is not necessary. Further, there is an advantage in that the weight of the battery module 100 can be significantly reduced only by the removed module frame and end plate. Further, the battery module 100 according to the present embodiment has an advantage that re-workability is favorable in the battery pack assembly process due to the removal of the module frame. In contrast, the conventional module frame having a battery module could not be reworked even if a defect occurs due to the welding structure of the module frame.

Figure 2:
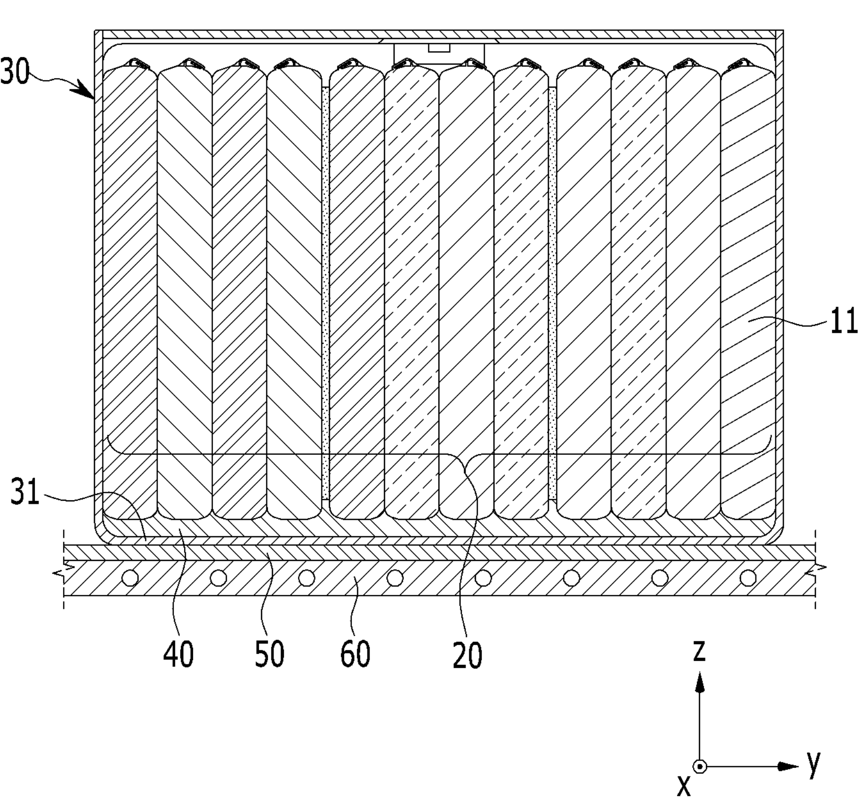
FIG. 2 is a cross-sectional view showing a cross section taken along the cutting line A-A' of FIG. 1.

In addition, the upper surface and the lower surface of the battery cell stack 200 are exposed to the outside, which is effective for heat dissipation and thus can improve the cooling performance, as compared with the conventional battery module 10 (refer to FIGS. 1 and 2) in which the battery cell stack 20 is surrounded by the module frame 30. Here, the upper surface means a surface of the battery cell stack 200 in the z-axis direction, and the lower surface means a surface of the battery cell stack 200 in the −z-axis direction.

Meanwhile, as long as the elastic member 700 has a predetermined elastic force, the material thereof is not particularly limited. In one example, it may include at least one of a polymer composite material, a composite material such as fiber-reinforced plastic (FRB), and a metal alloy.

The thermal conductive resin layer 200TR can be formed by applying a thermal conductive resin. Specifically, the thermal conductive resin layer 200TR can be formed by applying the thermal conductive resin onto the heat sink 800, positioning the battery cell stack 200 according to the present embodiment thereon, and then curing the thermal conductive resin.

The thermal conductive resin may include a thermal conductive adhesive material, and specifically, it may include at least one of a silicone material, a urethane material, and an acrylic material. The thermal conductive resin is a liquid during application but is cured after application, so that it can perform the role of fixing a plurality of battery cells 110 constituting the battery cell stack 200. Further, the thermal conductive resin is excellent in heat transfer properties, and thus can quickly transfer the heat generated from the battery cells 100 to the heat sink 800, thereby preventing overheating of the battery pack 100.

In the battery module 100 according to the present embodiment, as described above, the elastic member 700 covers the front surface, rear surface and both side surfaces of the battery cell stack 200, and is opened in its lower portion, so that the lower surface of the battery cell stack 200 is exposed. Thereby, the lower surface of the battery cell stack 200 comes into contact with the thermal conductive resin layer 200TR. The elastic member 700 according to the present embodiment is configured so as to cover the front surface and rear surface of the battery cell stack 200 in which the first and second electrode leads 111 and 112 are located, rather than the upper surface and the lower surface of the battery cell stack 200. From this point of view, the present battery module is different from the conventional battery module 10. Since the heat generated from the battery cell 110 can be transferred directly to the heat sink 800 via the thermal conductive resin layer 200TR, the heat transfer path is simplified and the heat transfer preventive factor such as an air gap does not occur. Therefore, the battery module according to the present embodiment has improved cooling and heat dissipation performance compared to the conventional battery module.

Figure 6:
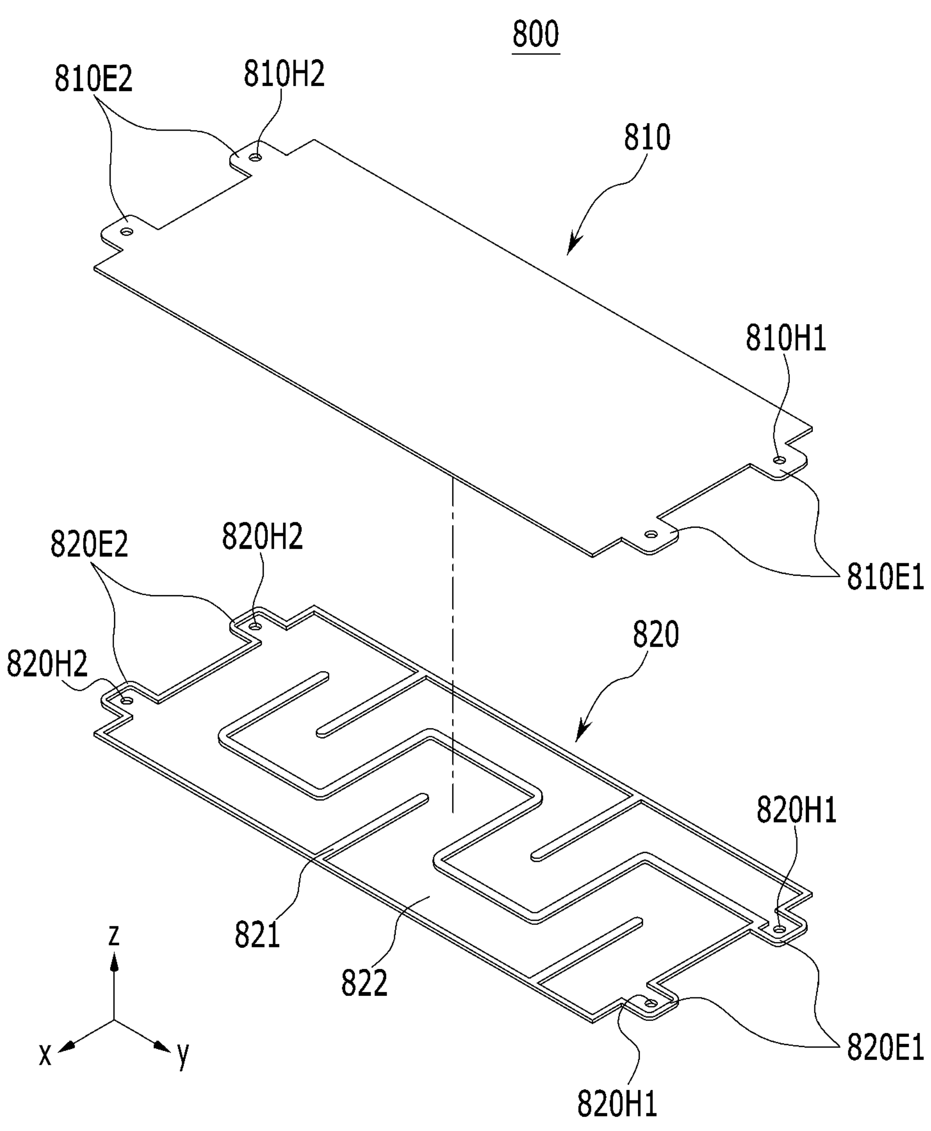
FIG. 6 is an exploded perspective view showing a heat sink included in the battery module of FIG. 3.

FIG. 6 is an exploded perspective view showing a heat sink included in the battery module of FIG. 3.

Referring to FIGS. 3 and 6, the heat sink 800 according to the present embodiment has a configuration in which refrigerant flows therein. The refrigerant is a medium for cooling, and is not particularly limited, but may be a cooling water.

Specifically, the heat sink 800 may include an upper plate 810 and a lower plate 820 that form a space in which the refrigerant flows. The upper plate 810 and the recessed portion 822 of the lower plate 820 may form a refrigerant flow path.

The upper plate 810 may be a plate member including a metal material having high thermal conductivity. The above-mentioned thermal conductive resin layer 200TR may be located on the upper plate 810.

The lower plate 820 may include a base portion 821 that forms the skeleton of the lower plate 820 and is joined with the upper plate 810, and a recessed portion 822 which is recessed downward from the base portion 821 and forms a refrigerant flow path.

The recessed portion 822 corresponds to a portion where the base portion 821 is recessed downward. The recessed portion 822 may be a U-shaped pipe having a cross section cut vertically with respect to the direction in which the refrigerant flow path extends, that is, a cross section cut into the xz plane or the yz plane. The upper plate 810 may be located on the open upper side of the U-shaped pipe. A space between the recessed portion 822 and the upper plate 810 becomes a region through which the refrigerant flows, that is, a flow path of the refrigerant.

The base portion 821 and the upper plate 810 can be joined by welding. Therefore, the refrigerant can flow in the recessed portion 822 without leakage.

For effective cooling, as shown in FIG. 6, it is preferable that the recessed portion 822 be formed over the entire region of the heat sink 800. For this purpose, the recessed portion 822 may be bent at least once and continue from one side to the other. In particular, in order to form the recessed portion 822 over the entire region of the heat sink 800, the recessed portion 822 is preferably bent several times. As the refrigerant moves from the start point to the end point of the refrigerant flow path with respect to the entire region of the lower surface of the battery cell stack 200, efficient cooling of the entire region of the battery cell stack 200 can be achieved.

Meanwhile, the upper plate 810 according to the present embodiment may include upper extension portions 810E1 and 810E2 extending from both sides of the upper plate 810. More specifically, the first upper extension portion 810E1 is extended from one side of the upper plate 810, and a second upper extension portion 810E2 may be extended from the other side. The number of the upper extension portions 810E1 and 810E2 is not particularly limited. As shown in FIG. 6, the first upper extension portions 810E1 and the second upper extension portions 810E2 may be configured by a plurality of numbers, respectively.

The upper extension portions 810E1 and 810E2 may have upper through-holes 810H1 and 810H2 into which a refrigerant-delivering bolt 830 described later can be inserted. Specifically, a first upper through-hole 810H1 may be formed in the first upper extension portion 810E1, and a second upper through-hole 810H2 may be formed in the second upper extension portion 810E2.

Meanwhile, the lower plate 820 according to the present embodiment may include lower extension portions 820E1 and 820E2 extending from both sides of the lower plate 820 to the portions where the upper extension portions 810E1 and 810E2 are located. More specifically, the first lower extension portion 820E1 extends from one side of the lower plate 820, and a second lower extension portion 820E2 may extend from the other side. The number of the lower extension portions 820E1 and 820E2 is not particularly limited. As shown in FIG. 6, the first lower extension portion 820E1 and the second lower extension portion 820E2 may be configured by a plurality of numbers, respectively.

The lower extension portions 820E1 and 820E2 may have lower through-holes 820H1 and 820H2 into which a refrigerant-delivering bolt 830 described later can be inserted. Specifically, a first lower through-hole 820H1 may be formed in the first lower extension portion 820E1, and a second lower through-hole 820H2 may be formed in the second lower extension portion 820E2.

The upper extension portions 810E1 and 810E2 and the lower extension portions 820E1 and 820E2 have shapes corresponding to each other and may be extended and formed so as to pass through the elastic member 700. In the corresponding upper extension portions 810E1 and 810E2 and the lower extension portions 820E1 and 820E2, the upper through-holes 810H1 and 810H2 and the lower through-holes 820H1 and 820H2 may be located so as to correspond to each other.

Figure 7:
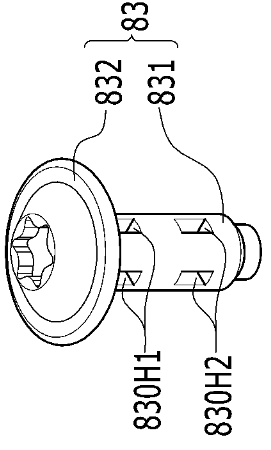
FIGS. 7*a* to 7*c* are views showing a refrigerant-delivering bolt according to an embodiment of the present disclosure.
Figure 7:
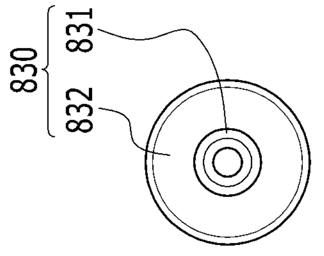
Figure 7:
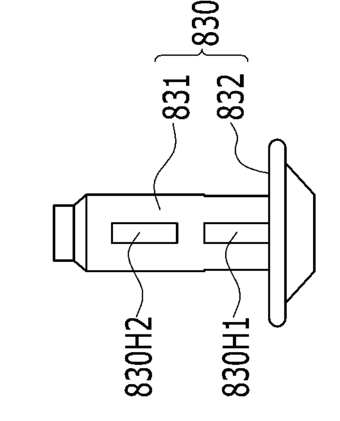
Figure 7:

Next, referring to FIGS. 7*a* to 7*c*, a refrigerant-delivering bolt that can be inserted into the upper through-holes 810H1 and 810H2 and the lower through-holes 820H1 and 820H2 described above will be described in detail.

FIGS. 7*a* to 7*c* are views showing a refrigerant-delivering bolt according to an embodiment of the present disclosure. Specifically, FIG. 7*a* is a perspective view of the refrigerant-delivering bolt 830, FIG. 7*b* is a plan view of the refrigerant-delivering bolt 830 as viewed from below, and FIG. 7*c* is the refrigerant-delivering bolt 830 of FIG. 7*a* as viewed from the side surface after turning over it.

Referring to FIGS. 7*a* to 7*c*, the refrigerant-delivering bolt 830 according to an embodiment of the present disclosure is configured to be inserted into the upper through-holes 810H1 and 810H2 and the lower through-holes 820H1 and 820H2 described above, and a connection pipe is formed therein. The structure of the connection pipe will be described later with reference to FIGS. 12 and 13.

The refrigerant-delivering bolt 830 may include a body portion 831 in which the connection pipe is formed therein, and a head portion 832 located at an upper end of the body portion 831. The body portion 831 has a columnar configuration having a diameter corresponding to the inner diameter of the upper through-holes 810H1 and 810H2 and the lower through-holes 820H1 and 820H2. Although not specifically shown, a screw thread may be formed on the outer peripheral surface. A first opening 830H1 and a second opening 830H2 connected to the connection pipe may be formed in the body portion 831. The first opening 830H1 and the second opening 830H2 may be disposed so as to have a difference in height from each other along the height direction of the body portion 831. Further, since the number of each of the first opening 830H1 and the second opening 830H2 is not limited, the openings may be configured by a singular number or a plurality of numbers.

The head portion 832 is configured to have a larger diameter than the body portion 831, and can firmly adhere the upper extension portions 810E1 and 810E2 and the lower extension portions 820E1 and 820E2 to each other.

Hereinafter, the first sensing block, the second sensing block, and the LV sensing assembly according to an embodiment of the present disclosure will be described in detail with reference to FIGS. 8 and 9, and the like.

Figure 8:
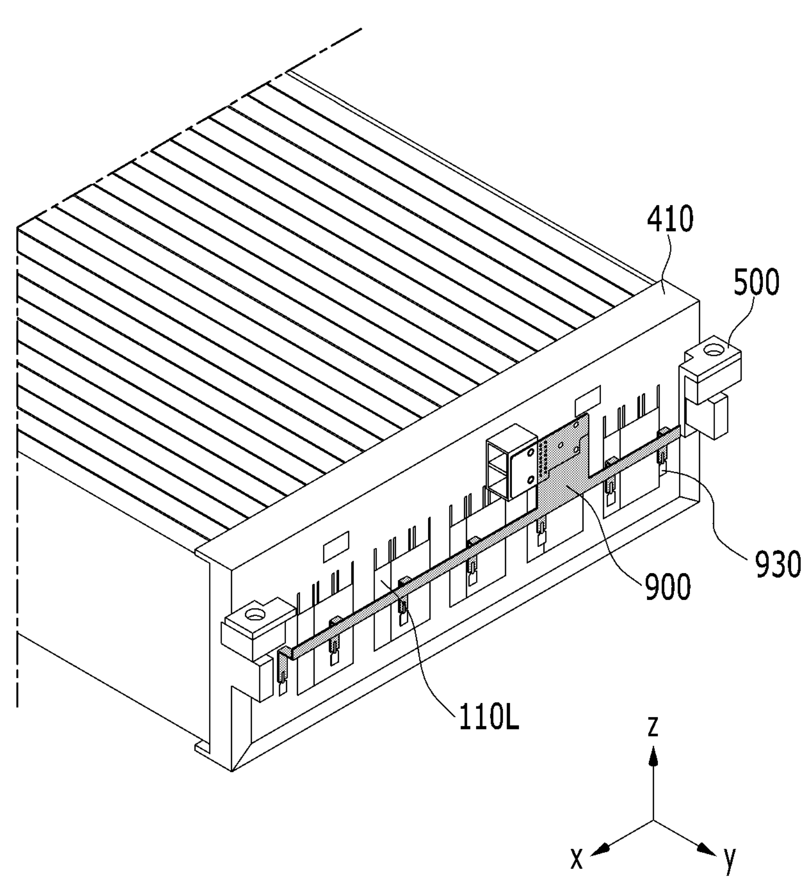
FIG. 8 is a partial perspective view showing an enlarged front portion of the battery module of FIG. 3.

FIG. 8 is a partial perspective view showing an enlarged front portion of the battery module of FIG. 3. FIG. 9 is a view of the front part of the battery module of FIG. 8 as viewed from the front. However, FIGS. 8 and 9 show the state in which the elastic member 700, the thermal conductive resin layer 200TR, and the heat sink 800 are omitted for convenience of explanation.

Referring to FIGS. 3, 5, 8 and 9, the battery module 100 according to an embodiment of the present disclosure may include a first sensing block 410 and a second sensing block 420 that cover the front surface and the rear surface of the battery cell stack 200 in which the electrode leads 111 and 112 protrude, respectively. The first sensing block 410 may be located between the front surface of the battery cell stack 200 and the elastic member 700, and the second sensing block 420 may be located between the rear surface of the battery cell stack 200 and the elastic member 700. That is, the elastic member 700 may be continuously connected along the first sensing block 410, the second sensing block 420, and both side surfaces of the battery cell stack 200.

The first sensing block 410 and the second sensing block 420 may include a material having electrical insulation. In one example, it may include a plastic material, a polymer material, or a composite material. Further, the first sensing block 410 and the second sensing block 420 may have a kind of basket shape, and may be configured to cover the front surface and the rear surface of the battery cell stack 200, respectively.

Figure 9:
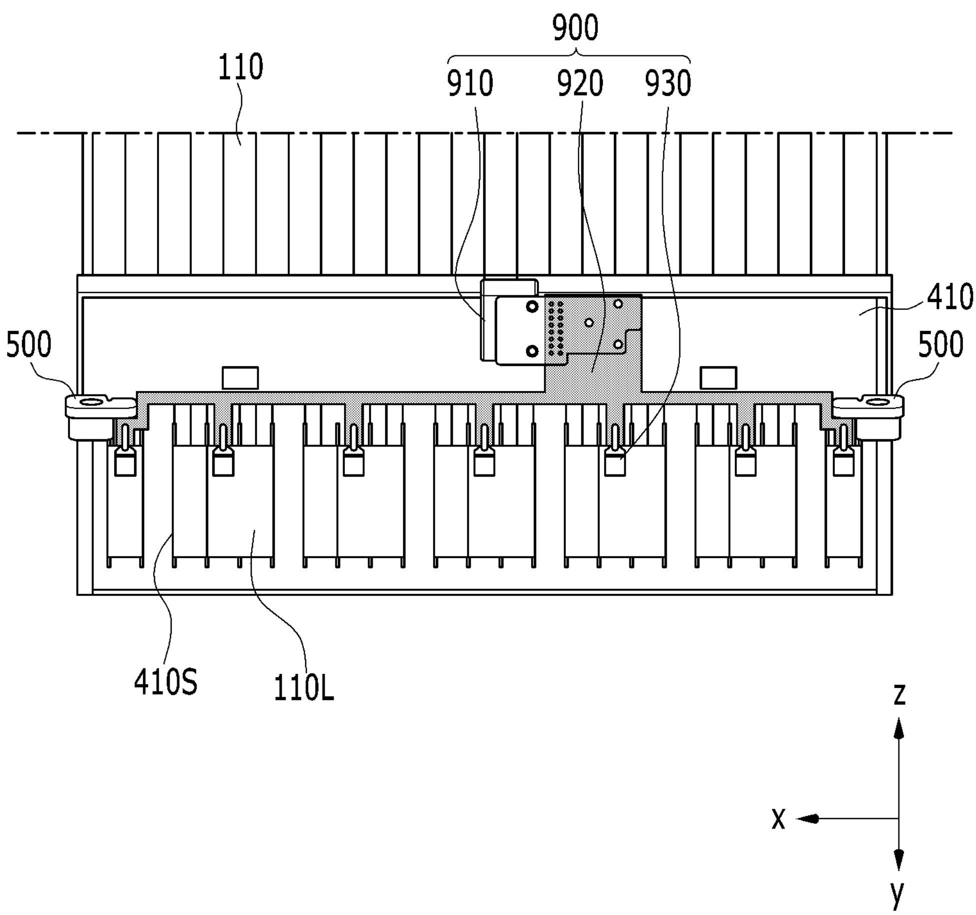
FIG. 9 is a view of the front part of the battery module of FIG. 8 as viewed from the front.

Next, in order to avoid repetition of the description, the first sensing block 410 shown in FIGS. 8 and 9 will be mainly described, but the same or similar structure may be applied to the second sensing block 420.

As described above, electrode leads 111 and 112 may be located on the front surface and the rear surface of the battery cell stack 200. A slit 410S can be formed in the first sensing block 410, and the electrode leads 111 and 112 can pass through the slit 410S when the first sensing block 410 is disposed. Next, at least two electrode leads 111 and 112 may be bent and joined to form an electrode lead joint 110L. Specifically, the electrode leads 111 and 112 protruding in the same direction with respect to the adjacent battery cells 110 are bent in a direction perpendicular to the protruding direction of the electrode leads 111 and 112, and can be joined to each other to form an electrode lead joint 110L. Therefore, one surface of the electrode lead joint 110L may be perpendicular to a direction (y-axis direction) in which the electrode leads 111 and 112 protrude from the battery cell 110. At this time, electrode leads having the same polarity can be joined to each other, or electrode leads having different polarities from each other can be joined to each other. In other words, in order to realize a parallel connection between the battery cells 110, electrode leads having the same polarity can be joined to each other, and in order to realize a series connection between the battery cells 110, electrode leads having different polarities from each other can be joined to each other. This may vary depending on the design of the battery module.

Meanwhile, the electrode leads 111 and 112 of the battery cells 110 located outside the battery cell stack 200 may be connected to a terminal busbar 500. Unlike the conventional battery module in which electrode leads are connected to each other via a busbar, the electrode leads 111 and 112 according to the present embodiment are joined directly to each other, and a part thereof can be connected to the terminal busbar 500, thereby forming a high voltage (HV) connection. Here, the HV connection is a connection that plays a role of a power source for supplying power, and refers to a connection between battery cells or a connection between battery modules. Unlike the conventional battery module in which electrode leads are connected to each other via a busbar, the electrode leads 111 and 112 according to the present embodiment are joined directly to each other, and a part thereof is connected to the terminal bus bar 500, thereby forming an HV connection. Therefore, in the HV connection structure according to the present embodiment, the busbar and the busbar frame to which the busbar is mounted can be removed.

Meanwhile, the battery module 100 according to the present embodiment may include a low voltage (LV) sensing assembly 900 for transmitting voltage information of a battery cell. The LV sensing assembly 900 may be located on at least one of the first sensing block 410 and the second sensing block 420. Specifically, the LV sensing assembly 900 may be located on a surface of the first sensing block 410 that is opposed to the surface facing the battery cell stack 200. Likewise, although not specifically illustrated, the LV sensing assembly 900 may be located on a surface of the second sensing block 420 that is opposed to the surface facing the battery cell stack 200.

The LV sensing assembly 900 is for a low voltage (LV) connection, where the LV connection means a sensing connection for sensing and controlling a voltage of a battery cell. Voltage information and temperature information of the battery cell 110 may be transmitted to an external BMS (Battery Management System) via the LV sensing assembly 900. The LV sensing assembly 900 may be connected to the electrode lead joint 110L.

This LV sensing assembly 900 may include an LV connector 910, a connection member 920 for connecting the LV connector 910 and the electrode leads 111 and 112, and a joining plate 930 located at one end of the connection member 920 and joined to the electrode leads 111 and 112.

The LV connector 910 may be configured to transmit and receive signals to and from an external control device in order to control the plurality of battery cells 110. The connection member 920 may be a flexible printed circuit board (FPCB) or a flexible flat cable (FFC). The voltage and temperature information measured from the plurality of battery cells 110 can be transmitted to an external BMS (battery management system) via the connection member 920 and the LV connector 910. That is, the LV sensing assembly 900 including the LV connector 910 and the connection member 920 can detect and control phenomena such as overvoltage, overcurrent, and overheating of each battery cell 110. The joining plate 930 is located at one end of the connection member 920 and can be composed of a metal material having electrical conductivity. The joining plate 930 is joined to the electrode leads 111 and 112, so that the connection member 920 and the electrode lead 111 can be electrically and physically connected. Specifically, one side of the joining plate 930 is coupled with the connection member 920 by being bent after passing through the connection member 920, and the other side of the joining plate 930 may be formed in a plate shape and joined to the electrode leads 111 and 112, particularly, weld-joined.

On the other hand, as described above, the battery cells 110 may be stacked along the x-axis direction to form the battery cell stack 200, whereby the electrode leads 111 and 112 may protrude in the y-axis direction and the −y-axis direction, respectively. Further, at least two electrode leads 111 and 112 can be bent and joined to form an electrode lead joint 110L. The joining plate 930 of the LV sensing assembly 900 may be joined directly to the electrode lead joint 110L, so that the LV sensing assembly 900 and the electrode leads 111 and 112 can be connected to each other. Since the battery module 100 according to the present embodiment can proceed at a time without making HV connection and LV connection, respectively, it has the advantages that improvement in the productivity can be expected, components such as a busbar frame can be removed, and the battery module 100 having a more compact configuration can be manufactured.

In the joining between the electrode leads 111 and 112 for forming the electrode lead joint 110L, or in the joining between the electrode lead joint 110L and the joining plate 930, the joining method is not particularly limited if an electrical connection is possible, and as an example, weld-joining can be performed. Further, although the electrode leads 111 and 112 protruding in the y-axis direction was mainly described, the structure of the electrode lead joint 110L and the LV sensing assembly 900 can be formed similarly to the electrode leads 111 and 112 protruding in the −y-axis direction.

Meanwhile, as shown in FIG. 3, the elastic member 700 according to the present embodiment may cover the electrode leads 111 and 112, that is, the electrode lead joint 110L. Structurally, the electrode lead joint 110L is located outside the first sensing block 410 or the second sensing block 420, and such elastic member 700 covers the electrode lead joint 110L, thereby capable of primarily protecting the electrode leads 111 and 112 from an external environment.

Meanwhile, referring again to FIG. 4, the battery module 100 according to the present embodiment may further include a cooling fin 300 located between the battery cells 110. Although only one cooling fin 300 is shown in FIG. 4, all of the cooling fins 300 according to the present embodiment may be located between the battery cells 110.

The cooling fin 300 may include a metal material having high thermal conductivity. The specific material is not limited, and as an example, it may include aluminum (Al). Cooling fins 300 with high thermal conductivity may be disposed between the battery cells 110 and directly attached to increase the cooling area. Thereby, the cooling performance is improved.

On the other hand, as described above, the lower portion of the elastic member 700 is opened and the lower surface of the battery cell stack 200 is exposed to the outside. However, the cooling fins 300 according to the present embodiment may protrude from the lower surface of the battery cell stack 200. Thereby, the cooling fins 300 according to the present embodiment may be in direct contact with the thermal conductive resin layer 200TR. By directly contacting the cooling fins 300 disposed between the battery cells 110 with the thermal conductive resin layer 200TR, the heat dissipation performance of the battery module can be maximized.

Meanwhile, the battery module 100 according to the present embodiment may further include a side pad 600 located between the both side surfaces of the battery cell stack 200 and the elastic member 700. The side pad 600 may include a plastic material having elastic properties and manufactured by injection molding.

Hereinafter, a battery pack according to an embodiment of the present disclosure will be described in detail with reference to FIGS. 10 to 14.

Figure 10:
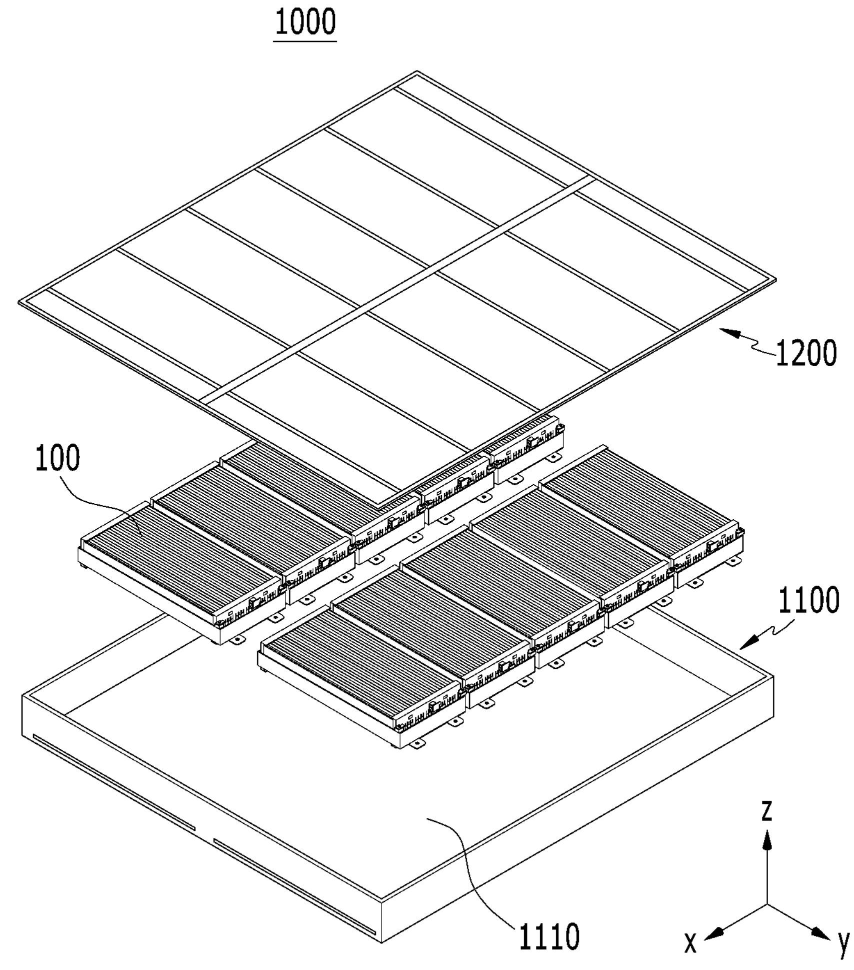
FIG. 10 is an exploded perspective view showing a battery pack according to an embodiment of the present disclosure.
Figure 11:
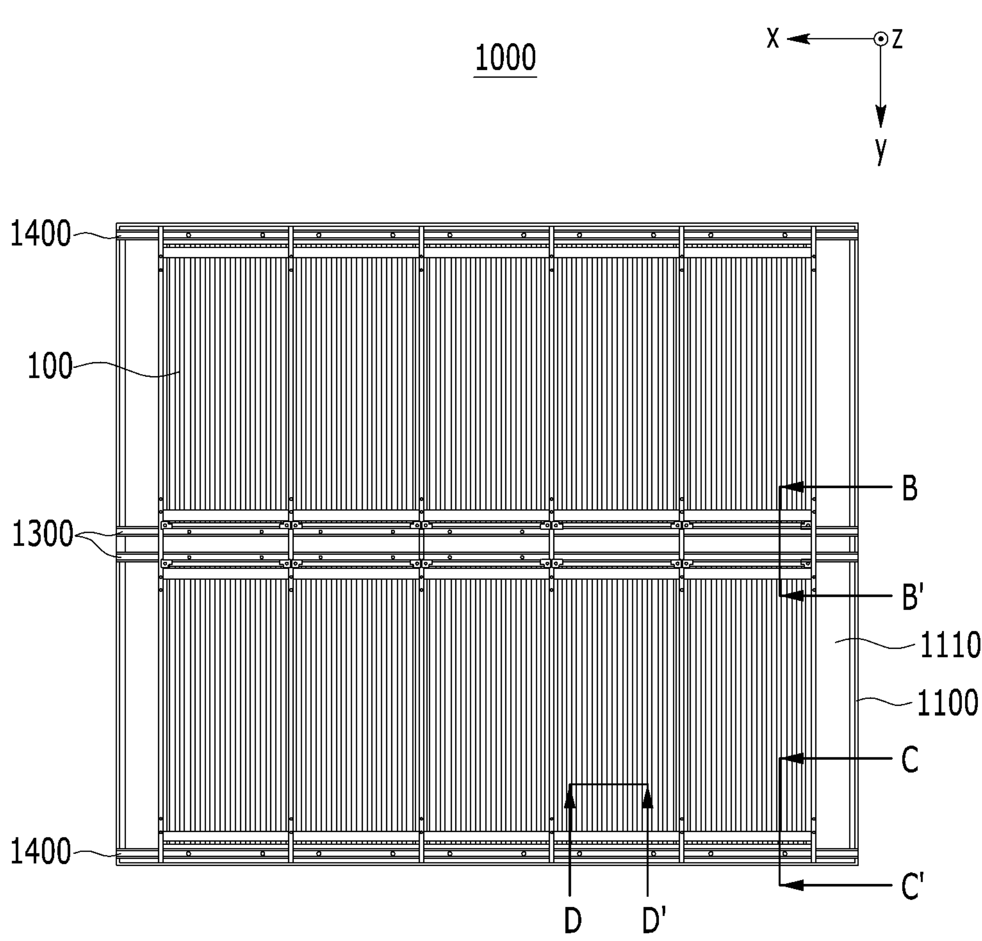
FIG. 11 is a plan view of the battery pack of FIG. 10 as viewed in the −z-axis direction on an xy plane.

FIG. 10 is an exploded perspective view showing a battery pack according to an embodiment of the present disclosure. FIG. 11 is a plan view of the battery pack of FIG. 10 as viewed in the −z-axis direction on an xy plane. At this time, for convenience of explanation, FIG. 11 shows a state in which the upper cover 1200 of FIG. 10 has been removed.

Referring to FIGS. 10 to 11, the battery pack 1000 according to an embodiment of the present disclosure may include a battery module 100; a pack frame 1100 for housing the battery module 100; a refrigerant-delivering bolt 830 for fixing the heat sink 800 of the battery module 100 to the pack frame 1100; and pack refrigerant pipes 1300 and 1400 for supplying or discharging refrigerant to the heat sink 800.

The battery module 100 includes a battery cell stack 200, an elastic member 700, a thermal conductive resin layer 200TR and a heat sink 800, as described above. The description concerning each configuration is omitted since it overlaps with the above-mentioned contents.

A plurality of battery modules 100 may be seated on the bottom portion 1110 of the pack frame 1100. Further, an upper cover 1200 for covering the pack frame 1100 can be disposed.

The pack refrigerant pipes 1300 and 1400 may include a pack refrigerant supply pipe 1300 for supplying refrigerant and a pack refrigerant discharge pipe 1400 for discharging the refrigerant. The pack refrigerant supply pipe 1300 may supply a refrigerant to the heat sink of the battery module 100. The refrigerant flows through the inside of the heat sink and then is discharged to the pack refrigerant discharge pipe 1400.

Hereinafter, the refrigerant delivering method using the refrigerant-delivering bolt will be described in detail.

Figure 12:
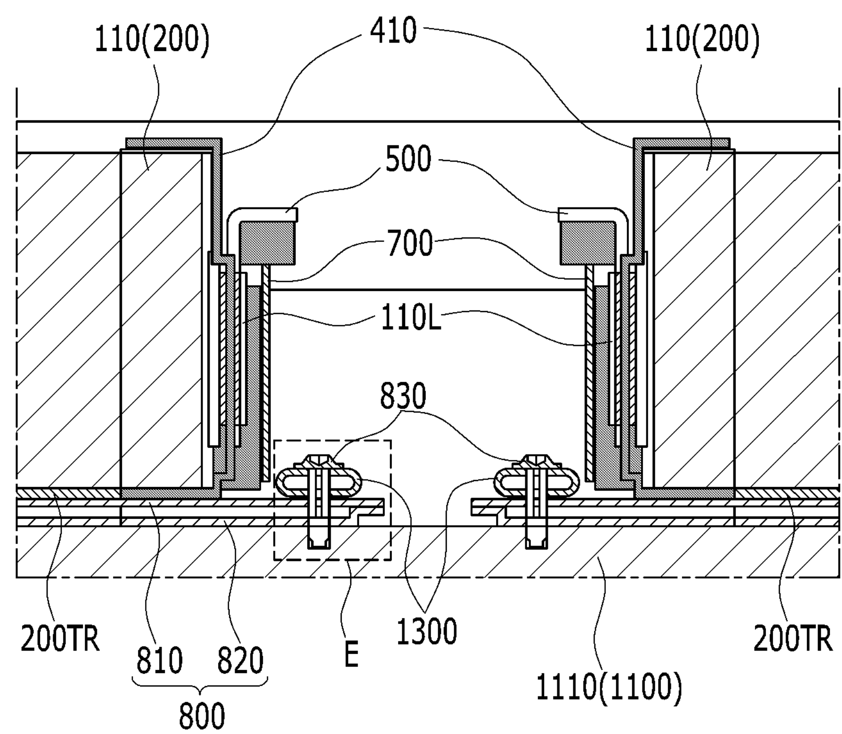
FIG. 12 is a cross-sectional view showing a cross section taken along the cutting line B-B' of FIG. 11.
Figure 12:
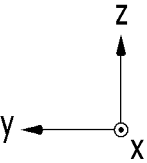
Figure 13:
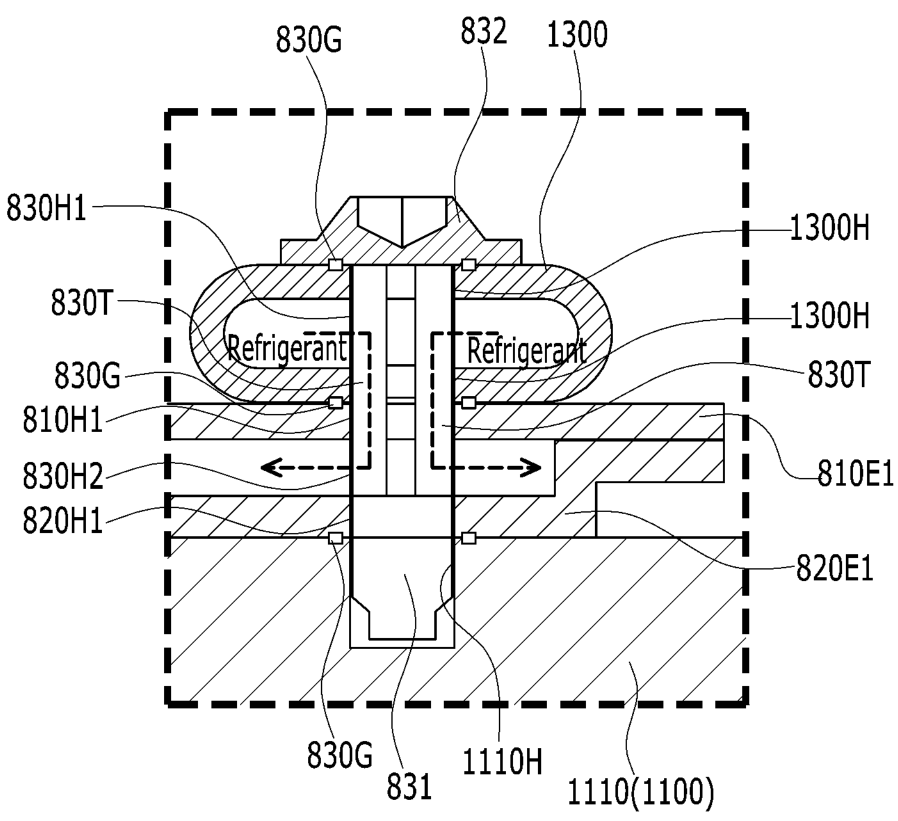
FIG. 13 is a partial view showing an enlarged section "E" of FIG. 12.

FIG. 12 is a cross-sectional view showing a cross section taken along the cutting line B-B' of FIG. 11. FIG. 13 is a partial view showing an enlarged section "E" of FIG. 12.

Referring to FIGS. 6, 7, 12 and 13, the refrigerant-delivering bolt 830 according to the present embodiment can fix the heat sink 800 of the battery module 100 to the bottom portion 1110 of the pack frame 1100.

Specifically, the first upper extension portion 810E1 and the first lower extension portion 820E1 can be extended from the upper plate 810 and the lower plate 820 of the heat sink 800 so as to pass through the first sensing block 410 and the elastic member 700.

A first upper through-hole 810H1 may be formed in the first upper extension portion 810E1, and a first lower through-hole 820H1 may be formed in the first lower extension 820E1. The refrigerant-delivering bolt 830 according to the present embodiment sequentially passes through the first upper through-hole 810H1 and the first lower through-hole 820H1, and then can be fixed to the fastening hole 1110H formed in the bottom portion 1110 of the pack frame 1100. In this manner, the refrigerant-delivering bolt 830 can fix the first upper extension portion 810E1 and the first lower extension portion 820E1 to the pack frame 1100.

Screw threads may be formed on the outer peripheral surface of the body portion 831 of the refrigerant-delivering bolt 830 and the inner surface of the fastening hole 1110H, respectively, and the body portion 831 and the fastening hole 1110H can be fixed by screwing.

At this time, a connection pipe 830T for connecting the pack refrigerant pipes 1300 and 1400 and the heat sink 800 is formed in the inside of the refrigerant-delivering bolt 830. A connection pipe 830T connected along the height direction (z-axis direction) may be formed inside the body portion 831 of the refrigerant-delivering bolt 830.

Further, a first opening 830H1 and a second opening 830H2 connected to the connection pipe 830T may be formed in the body portion 831. That is, the space of the first opening 830H1 and the second opening 830H2 is connected to each other via the connecting pipe 830T. The first opening 830H1 and the second opening 830H2 may be disposed so as to have a height difference from each other along the height direction of the body portion 831.

On the other hand, the pack refrigerant supply pipe 1300 according to the present embodiment may be connected to the refrigerant-delivering bolt 830, and as shown in FIGS. 12 and 13, the refrigerant-delivering bolt 830 passes through the supply pipe hole 1300H formed in the pack refrigerant supply pipe 1300 and can be fixed to the bottom portion 1110 of the pack frame 1100.

At this time, the first opening 830H1 may be disposed inside the pack refrigerant supply pipe 1300, and the second opening 830H2 may be disposed inside the heat sink 800. More specifically, the second opening 830H2 may be disposed between the first upper extension portion 810E1 and the first lower extension portion 820E1.

Due to such a structure, the refrigerant moving along the pack refrigerant supply pipe 1300 sequentially passes through the first opening 830H1, the connection pipe 830T and the second opening 830H2, and can flow into the inside of the heat sink 800, that is, between the upper plate 810 and the recessed portion 822 of the lower plate 820. The inflowing refrigerant may move along the recessed portion 822 of the heat sink 800 to cool the battery module 100 as described above.

The refrigerant-delivering bolt 830 according to the present embodiment not only has a function of mounting and fixing the heat sink 800 of the battery module 100 to the pack frame 1100, but also may function as a path for supplying a refrigerant to the lower end of the battery module 100. In addition, since the pack refrigerant supply pipe 1300, the heat sink 800, and the pack frame 1100 are strongly adhered to each other by the fixing force of the refrigerant-delivering bolt 830, the sealing property is improved, and the possibility of refrigerant leakage therebetween can be reduced. That is, it is possible to simultaneously perform the mounting-fixing, pressure sealing, and refrigerant delivering, thereby reducing the number of parts and simplifying the structure. Further, since the supply pipe hole 1300H, the first upper through-hole 810H1 and the first lower through-hole 820H1 are inevitably aligned by the refrigerant-delivering bolt 830, the effect on the alignment between the through holes required to supply the refrigerant can be minimized, and the possibility of refrigerant leakage can be reduced.

On the other hand, the battery pack according to the present embodiment may further include a gasket 830G surrounding the body portion 831 of the refrigerant-delivering bolt 830. The gasket 830G can be located on at least one of between the head part 832 and the pack refrigerant supply pipe 1300, between the pack refrigerant supply pipe 1300 and the first upper extension portion 810E1, and between the first lower extension portion 820E1 and the pack frame 1100. The gasket 830G has a sealable ring-shaped configuration and prevent leakage of refrigerant between layers.

Figure 14:
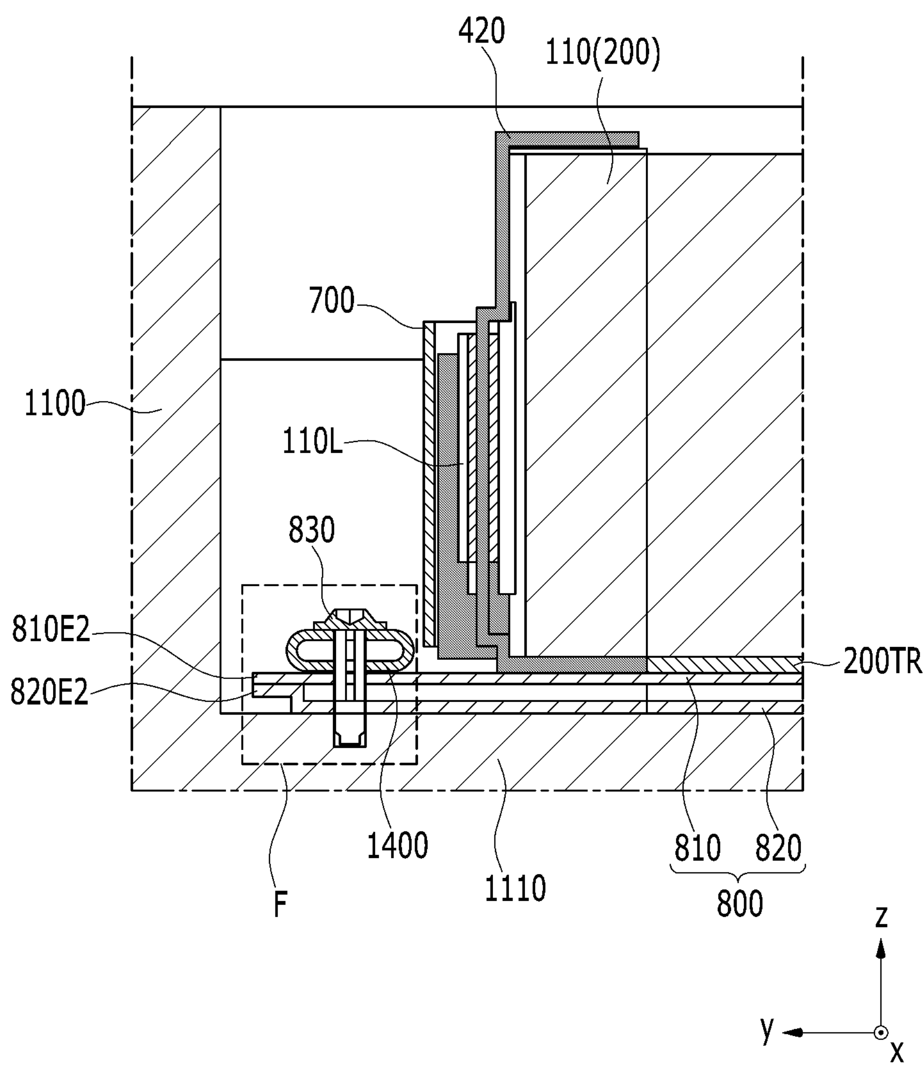
FIG. 14 is a cross-sectional view showing a cross section taken along the cutting line C-C' of FIG. 11.
Figure 15:
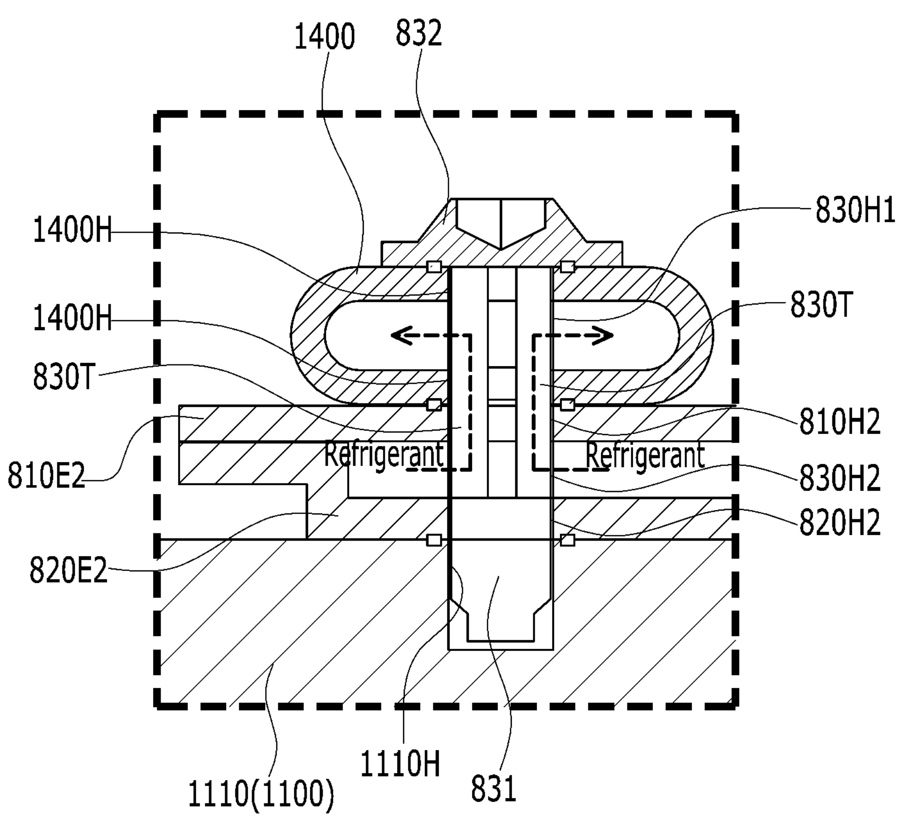
FIG. 15 is a partial view showing an enlarged section "F" of FIG. 14.

FIG. 14 is a cross-sectional view showing a cross section taken along the cutting line C-C' of FIG. 11. FIG. 15 is a partial view showing an enlarged section "F" of FIG. 14. The second upper extension portion 810E2 and the second lower extension portion 820E2 shown in FIGS. 14 and 15 will be mainly described.

Referring to FIGS. 6, 7, 14 and 15, a second upper extension portion 810E2 may be formed on one side of the upper plate 810 that is different from the side on which the first upper extension portion 810E1 is formed. A second lower extension portion 820E2 may be formed on one side of the lower plate 820 that is different from the side on which the first lower extension portion 820E1 is formed.

The second upper extension portion 810E2 and the second lower extension portion 820E2 can be extended from the upper plate 810 and the lower plate 820 of the heat sink 800 so as to pass through the second sensing block 420 and the elastic member 700. A second upper through-hole 810H2 may be formed in the second upper extension portion 810E2, and a second lower through-hole 820H2 may be formed in the second lower extension portion 820E2.

At this time, as shown in FIG. 6, the first lower extension portion 820E1 and the second lower extension portion 820E2 share a space with each other through one refrigerant flow path formed by the recessed portion 822.

The above-mentioned refrigerant-delivering bolt 830 sequentially passes through the second upper through-hole 810H2 and the second lower through-hole 820H2, and then can be inserted into the fastening hole 1110H formed in the bottom portion 1110 of the pack frame 1100. In this manner, the refrigerant-delivering bolt 830 can fix the second upper extension portion 810E2 and the second lower extension portion 820E2 to the pack frame 1100.

Further, the pack refrigerant discharge pipe 1400 according to the present embodiment may be connected to the refrigerant-delivering bolt 830. As shown in FIGS. 14 and 15, the refrigerant-delivering bolt 830 passes through the discharge pipe hole 1400H formed in the pack refrigerant discharge pipe 1400, and can be inserted into the bottom portion 1110 of the pack frame 1100.

At this time, the first opening 830H1 may be disposed inside the pack refrigerant discharge pipe 1400, and the second opening 830H2 may be disposed inside the heat sink 800. More specifically, the second opening 830H2 may be disposed between the second upper extension portion 810E2 and the second lower extension portion 820E2.

Due to such a structure, the refrigerant flowing into the heat sink 800 from the pack refrigerant supply pipe 1300 moves along the recessed portion 822, and then sequentially pass through the second opening 830H2, the connection pipe 830T, and the first opening 830H1, and can be discharged to the pack refrigerant discharge pipe 1400.

That is, the refrigerant-delivering bolts 830 according to the present embodiment may be configured by a plurality of numbers. When the heat sink 800 is fixed to the pack frame 1100, any one refrigerant-delivering bolt 830 connects the pack refrigerant supply pipe 1300 and the heat sink 800, and another refrigerant-delivering bolt 830 may connect the pack refrigerant discharge pipe 1400 and the heat sink 800. Depending on which one is connected, the connection pipe 830T may be a path for supplying the refrigerant or a path for discharging the refrigerant.

Referring back to FIG. 11, for each of the plurality of battery modules 100, the refrigerant is supplied from the pack refrigerant supply pipe 1300 via the refrigerant-delivering bolt, and then the refrigerant is discharged in the pack refrigerant discharge pipe 1400 via other refrigerant transfer bolts.

Hereinafter, as a modified example, a refrigerant-delivering bolt according to another embodiment of the present disclosure will be described. However, the description concerning the content that overlaps with the part described above will be omitted.

Figure 16:
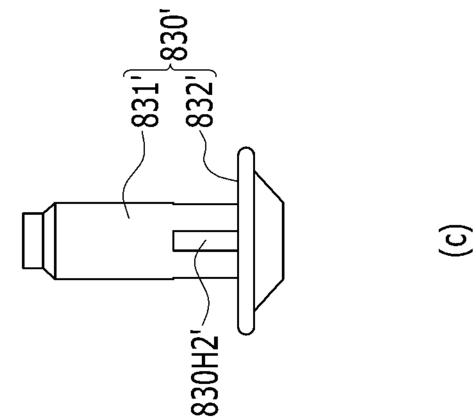
FIGS. 16*a* to 16*c* are views showing a refrigerant-delivering bolt according to another embodiment of the present disclosure.
Figure 16:
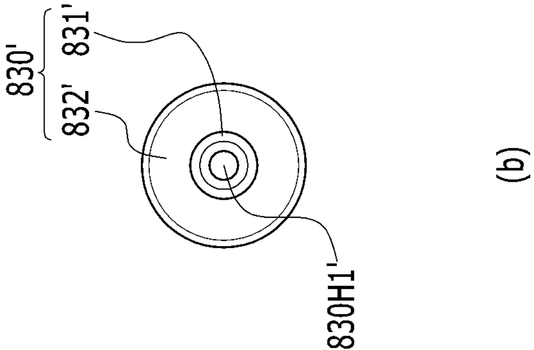
Figure 16:
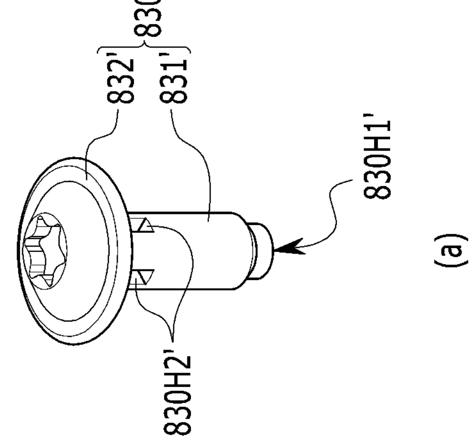
Figure 17:
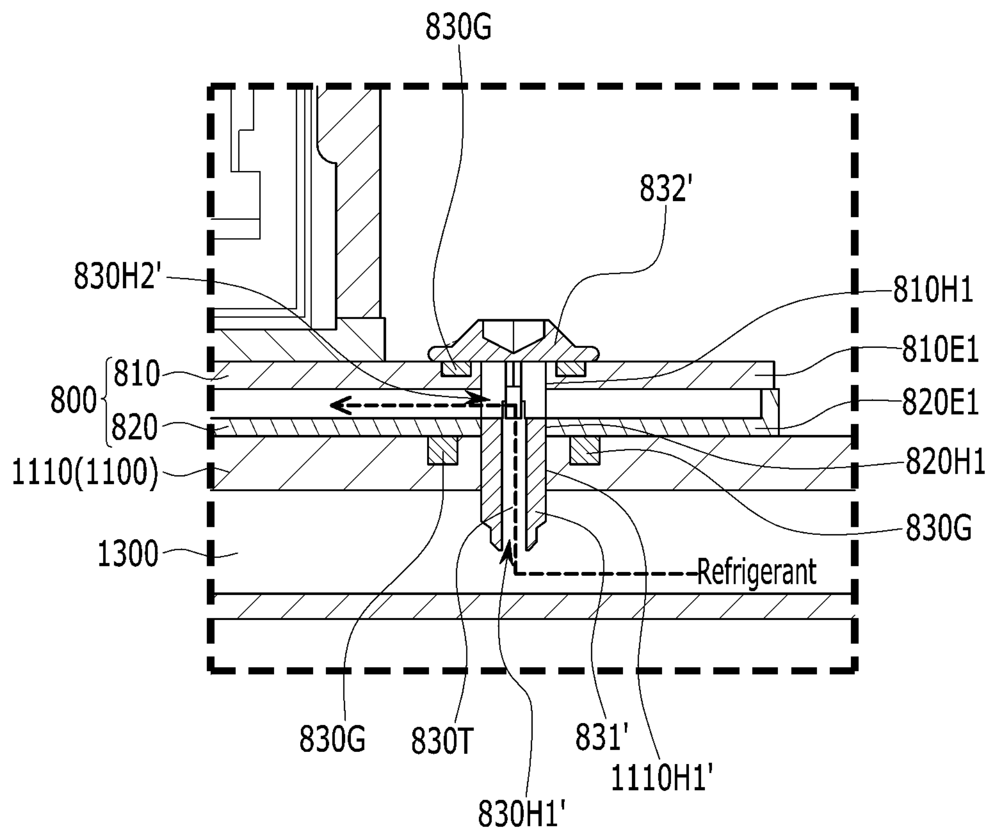
FIG. 17 is a cross-sectional view showing a state in which the refrigerant-delivering bolt of FIG. 16*a* is fixed to the pack frame.

FIGS. 16*a* to 16*c* are views showing a refrigerant-delivering bolt according to another embodiment of the present disclosure. FIG. 17 is a cross-sectional view showing a state in which the refrigerant-delivering bolt of FIG. 16*a* is fixed to the pack frame. Specifically, FIG. 16*a* is a perspective view of the refrigerant-delivering bolt 830', FIG. 16*b* is a plan view of the refrigerant-delivering bolt 830' of FIG. 16*a* as viewed from below, and FIG. 16*c* is a side view of the refrigerant-delivering bolt 830' of FIG. 16*a* as viewed from the side after turning over it.

Referring to FIGS. 16*a* to 16*c* and 17, the refrigerant-delivering bolt 830' according to another embodiment of the present disclosure may include a body portion 831' and a head portion 832'. A connection pipe 830T may be formed inside the body portion 831'. Further, a first opening 830H1' and a second opening 830H2' that are connected to the connection pipe 830T may be formed in the body portion 831'.

The difference from the refrigerant-delivering bolt 830 described above in FIGS. 7A to 7C is that the first opening 830H1' is formed at the end part of the body portion 831'. The opening direction of the first opening 830H1' may be parallel to the penetration direction of the connecting pipe 830T, and an opening direction of the second opening 830H2' may be perpendicular to a penetration direction of the connection pipe 830T. That is, the first opening 830H1' may be located at the end part of the body portion 831' while being connected to the connection pipe 830T, and the second opening 830H2' can be formed on the outer peripheral surface of the body portion 831' to be connected to the connection pipe 830T.

As shown in FIG. 17, the pack refrigerant supply pipe 1300 may be located under the bottom portion 1110 of the pack frame 1100. Thereby, the refrigerant-delivering bolt 830' sequentially passes through a first upper through hole 810H1 of the first upper extension portion 810E1, a first lower through hole 820H1 of the first lower extension portion 820E1 and a frame through hole 1110H' of the pack frame 1100, and can be connected to the pack refrigerant pipes 1300 and 1400.

The first opening 830H1' may be disposed inside the pack refrigerant supply pipe 1300, and the second opening 830H2' may be disposed inside the heat sink 800. The refrigerant moving along the pack refrigerant supply pipe 1300 sequentially passes through the first opening 830H1', the connection pipe 830T, and the second opening 830H2', and is supplied to the heat sink 800. The pack refrigerant supply pipe 1300 has been mainly described, but the same structure can also be applied to the pack refrigerant discharge pipe.

Figure 18:
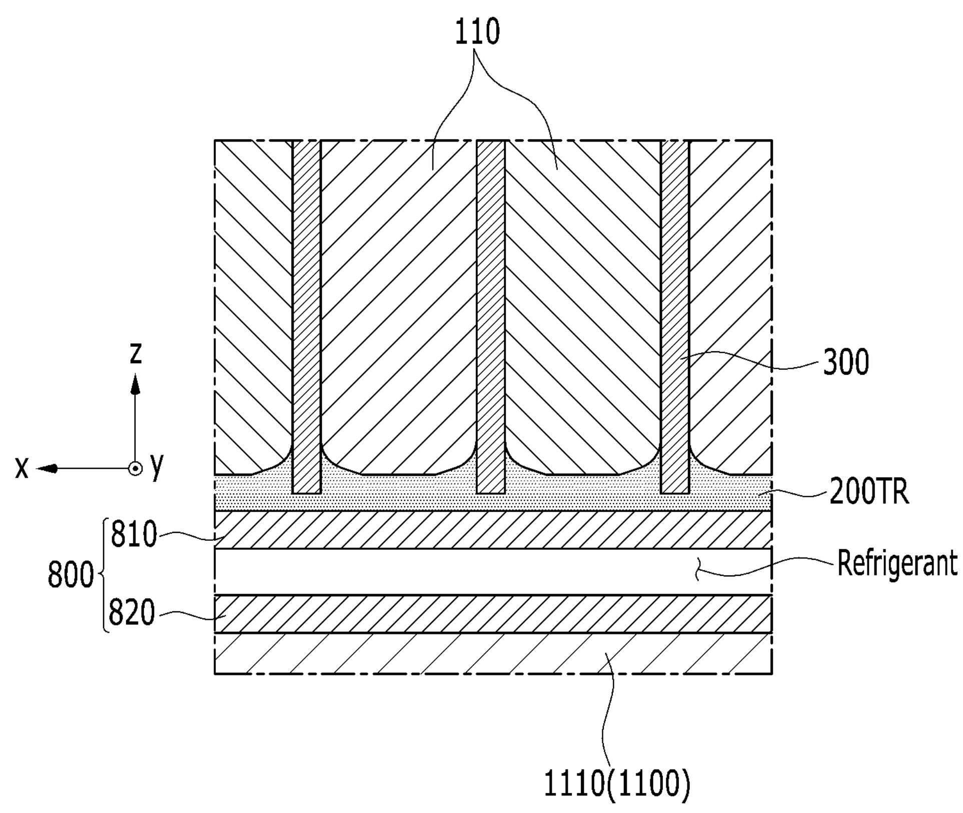
FIG. 18 is a cross-sectional view showing a cross section taken along the cutting line D-D' of FIG. 11.

FIG. 18 is a cross-sectional view showing a cross section taken along the cutting line D-D' of FIG. 11.

Referring to FIGS. 3, 12 and 18, as described above, the battery module 100 according to the present embodiment may form a module-less structure in which the module frame and the end plate have been removed, and the lower portion of the elastic member 700 is opened so that the lower surface of the battery cell stack 200 is exposed. The lower surface of the battery cell stack 200 comes into contact with the thermal conductive resin layer 200TR, and a heat sink 800 is located under the thermal conductive resin layer 200TR.

The heat generated in the battery cell 110 may be directly transferred to the bottom portion 1110 of the pack frame 1100 via the thermal conductive resin layer 200TR and the heat sink 800. Compared to the conventional battery module 10 (see FIGS. 1 and 2), the heat transfer path is simplified, and the heat transfer preventive factor such as an air gap does not occur. Therefore, the battery pack according to the present embodiment has improved cooling and heat dissipation performance.

Further, the cooling fins 300 according to the present embodiment can protrude from the lower surface of the battery cell stack 200 and come into contact with the thermal conductive resin layer 200TR. Since the lower surface of the battery cell stack 200 is exposed, the cooling fins 300 located between the battery cells 110 may come into direct contact with the thermal conductive resin layer 200TR. The cooling fins 300 facing the cell body 113 of the battery cell 110 is configured so as to directly contact the thermal conductive resin layer 200TR, so that the heat dissipation performance can be maximized.

Even though the terms indicating directions such as upper, lower, left, right, front and rear directions are used herein, it is obvious to those skilled in the art that these merely represent relative positions for convenience in explanation and may vary depending on a position of an observer, a position of an object, or the like.

The one or more battery modules according to the present embodiment as described above can be mounted together with various control and protection systems such as a battery management system (BMS) and a cooling system to form a battery pack.

The battery module or the battery pack can be applied to various devices. Specifically, these devices can be applied to vehicle means such as an electric bicycle, an electric vehicle, a hybrid vehicle, but the present disclosure is not limited thereto and can be applied to various devices that can use the secondary battery.

Although the preferred embodiments of the present disclosure have been described in detail above, the scope of the present disclosure is not limited thereto, and various modifications and improvements made by those skilled in the art using the basic concepts of the present disclosure defined in the following claims also falls within the spirit and scope of the present disclosure.

DESCRIPTION OF REFERENCE NUMERALS

100: battery module
200: battery cell stack
700: elastic member
800: heat sink
830: refrigerant-delivering bolt

The invention claimed is:

1. A battery module comprising:
a battery cell stack in which a plurality of battery cells having electrode leads are stacked;
an elastic member for covering a front surface, a rear surface and side surfaces of the battery cell stack;
a heat sink located under the battery cell stack and having a configuration in which a coolant flows therein; and
a thermal conductive resin layer located between the battery cell stack and the heat sink and formed by applying a thermal conductive resin onto the heat sink,
wherein a lower portion of the elastic member is open, and a lower surface of the battery cell stack contacts the thermal conductive resin layer,
wherein the thermal conductive resin layer contacts the heat sink,
wherein the heat sink comprises an upper plate and a lower plate that form a space in which refrigerant flows,
wherein the upper plate comprises upper extension portions extending from opposite sides of the upper plate,
wherein the lower plate comprises lower extension portions extending from opposite sides of the lower plate to a portion where the upper extension portions are located, and
wherein an upper through-hole is formed in the upper extension portions, and a lower through-hole is formed in the lower extension portions.

2. The battery module according to claim 1, wherein:
the elastic member is continuous along the front surface, the rear surface and the side surfaces of the battery cell stack.

3. The battery module according to claim 1, wherein:
the lower plate comprises a base portion joined to the upper plate, and a recessed portion that is recessed downward from the base portion to form a refrigerant flow path.

4. The battery module according to claim 1, further comprising:
a first sensing block and a second sensing block covering the front surface and the rear surface of the battery cell stack from which the electrode leads protrude, respectively,
wherein at least two of the electrode leads pass through a slit of the first sensing block or a slit of the second sensing block, and then are bent and joined to form an electrode lead joint, and
wherein the elastic member is continuous along the first sensing block, the second sensing block, and the side surfaces of the battery cell stack.

5. A battery pack comprising:
a battery module comprising:
a battery cell stack in which a plurality of battery cells having electrode leads are stacked; and
a heat sink located under the battery cell stack;
a pack frame for housing the battery module;

a refrigerant-delivering bolt for fixing the heat sink of the battery module to the pack frame; and a pack refrigerant pipe for supplying or discharging refrigerant to the heat sink, wherein a connection pipe for connecting the pack refrigerant pipe and the heat sink is formed inside the refrigerant-delivering bolt.

6. The battery pack according to claim 5, wherein:

the refrigerant-delivering bolt comprises a first opening and a second opening that are connected to the connection pipe, the first opening is disposed inside the pack refrigerant pipe, and the second opening is disposed inside the heat sink.

7. The battery pack according to claim 5, wherein:

the heat sink comprises an upper plate and a lower plate that form a space in which refrigerant flows, the upper plate comprises upper extension portions extending from sides of the upper plate, and the lower plate comprises lower extension portions extending from sides of the lower plate to a portion where the upper extension portions are located.

8. The battery pack according to claim 7, wherein:

the refrigerant-delivering bolt fixes the upper extension portions and the lower extension portions to the pack frame.

9. The battery pack according to claim 7, wherein:

an upper through-hole into which the refrigerant-delivering bolt can be inserted is formed in the upper extension portions, a lower through-hole into which the refrigerant-delivering bolt can be inserted is formed in the lower extension portions, and the refrigerant-delivering bolt passes through the upper through-hole and the lower through-hole and is fixed to the pack frame.

10. The battery pack according to claim 7, wherein:

the refrigerant-delivering bolt comprises a first opening and a second opening that are connected to the connection pipe, the first opening is disposed inside the pack refrigerant pipe, and the second opening is disposed between the upper extension portions and the lower extension portions.

11. The battery pack according to claim 7, wherein:

the upper extension portions and the lower extension portions pass through an elastic member covering a front surface, a rear surface and side surfaces of the battery cell stack.

12. The battery pack according to claim 5, wherein:

the refrigerant-delivering bolt fixes the pack refrigerant pipe to the pack frame.

13. The battery pack according to claim 5, wherein:

the pack refrigerant pipe comprises a pack refrigerant supply pipe and a pack refrigerant discharge pipe, the refrigerant-delivering bolt is configured by a plurality of numbers, and a first refrigerant-delivering bolt connects the pack refrigerant supply pipe and the heat sink, and a second refrigerant-delivering bolt connects the pack refrigerant discharge pipe and the heat sink.

14. The battery pack according to claim 7, further comprising a bolt for fixing the heat sink of the battery module to the pack frame passing through an upper through-hole formed in the upper extension portions and a lower through-hole formed in the lower extension portions.

15. The battery pack according to claim 5, further comprising a pack refrigerant pipe on the heat sink, the bolt passing through the pack refrigerant pipe, wherein the bolt has a connection pipe, a first opening in the bolt allowing the connection pipe to be in fluid communication with the heat sink and a second opening in the bolt allowing the connection pipe to be in fluid communication with the pack refrigerant pipe.

* * * * *